June 4, 1968     H. E. ERIKSON     3,386,355
PHOTOGRAPHIC EXPOSURE AND PROCESSING APPARATUS
Filed March 8, 1966     3 Sheets-Sheet 1

INVENTOR.
Herman E. Erikson
BY Brown and Mikulka
and
Charles L. McGuire
ATTORNEYS June 4, 1968 H. E. ERIKSON 3,386,355
PHOTOGRAPHIC EXPOSURE AND PROCESSING APPARATUS
Filed March 8, 1966 3 Sheets-Sheet 2

INVENTOR.
Herman E. Erikson
BY Brown and Mikulka
and
Charles S. McGuire
ATTORNEYS June 4, 1968  H. E. ERIKSON  3,386,355
PHOTOGRAPHIC EXPOSURE AND PROCESSING APPARATUS
Filed March 8, 1966  3 Sheets-Sheet 3
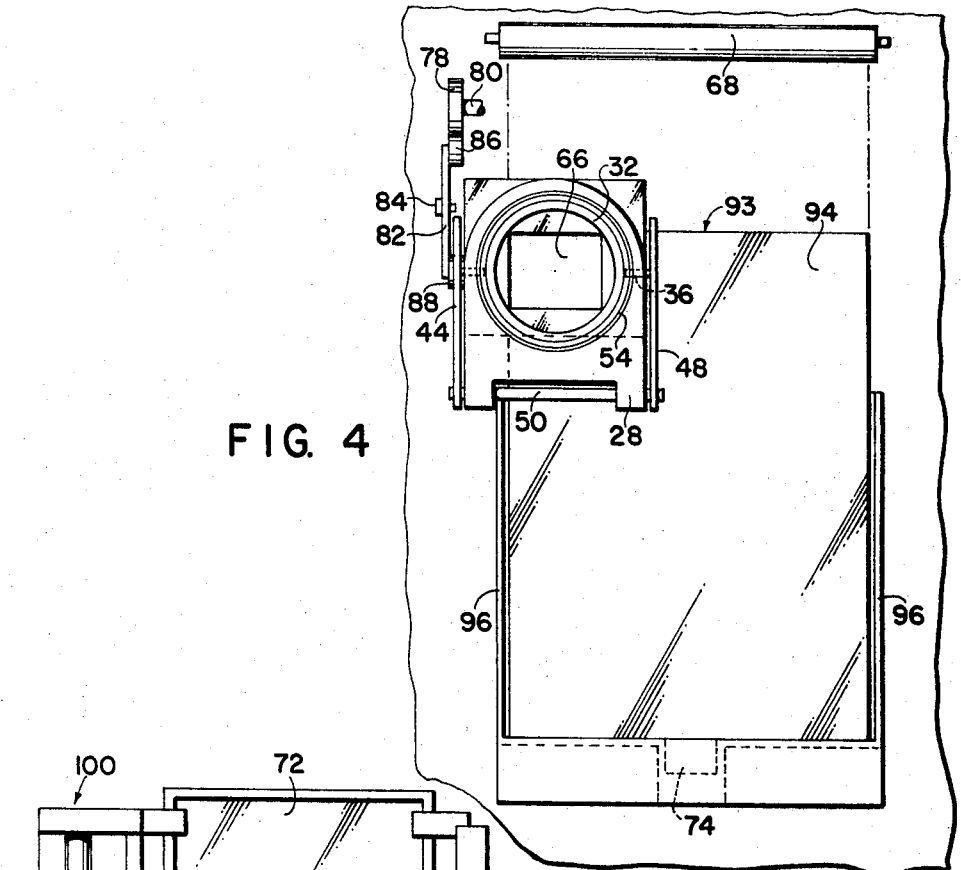
FIG. 4
FIG. 5
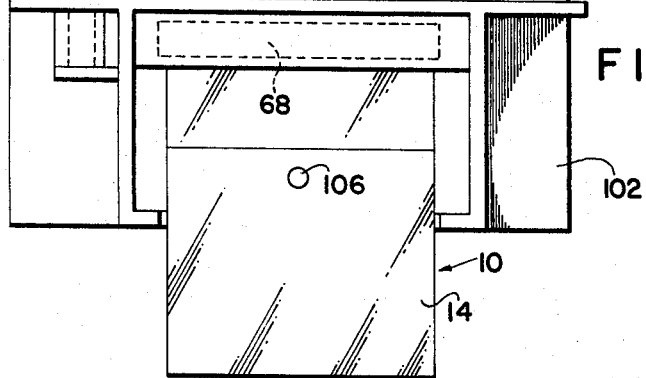
INVENTOR.
Herman E. Erikson
BY Brown and Mikulka
and
Charles S. McGuire
ATTORNEYS

United States Patent Office 3,386,355
Patented June 4, 1968

3,386,355
PHOTOGRAPHIC EXPOSURE AND
PROCESSING APPARATUS
Herman E. Erikson, Winchester, Mass., assignor to
Polaroid Corporation, Cambridge, Mass., a corporation of Delaware
Filed Mar. 8, 1966, Ser. No. 532,766
9 Claims. (Cl. 95—1.1)

The present invention relates to apparatus for effecting photographic exposure of a predetermined area of a photosensitive film unit, and more specifically to apparatus for effecting such exposure in a film unit of the self-developing type subsequent to the distribution of a liquid processing agent between a photoensitive sheet and a second sheet of the film unit.

It is sometimes desirable, e.g., for identification purposes, to form an image of printed reference matter, or other such indicia in a portion of a photosensitive sheet which has previously had another portion of its surface exposed to form therein a latent image of matter to which the indicia relates. In radiography, for instance, it is a common practice to make a radiographic exposure of a suitable film held within an X-ray cassette while shielding a portion of the film from exposure, thereby preserving such portion for later exposure. Prior to development of the film an image is formed in the previously unexposed portion of printed reference material relating to the exposure conditions and patient, or other subject of the exposure. Conventional apparatus and techniques may be employed for carrying out the above described steps; for example, a lead shield of predetermined dimensions may be positioned within the cassette to protect the desired portion of the film from radiographic exposure, and the reference material may be placed on a suitable card, or the like, and an image thereof formed in the protected portion by contact printing techniques after removal of the film from the cassette in a darkroom.

The present invention is concerned with a system which permits printed material, such as data relating to conditions and subjects of exposure, to be recorded on a portion of a previously exposed photographic negative in a film unit of the self-developing type. The invention will be described in connection with X-ray apparatus for employment to produce results of the general nature described in the preceeding paragraph, although it will be understood that the scope of the invention is not limited to such employment. U.S. Patent No. 3,087,816 of Edwin H. Land described a photographic diffusion transfer process wherein a processing composition is spread between a photosensitive stratum and an auxiliary stratum, one of which is transparent, and the photosensitive stratum is then photoexposed to form a latent image which develops spontaneously. This patent includes suitable examples of photographic materials for use in carrying out such a process and many such materials have sometime been in commercial use. Since the present invention is to be described in connection with an application to the field of radiography, an appropriate example of a suitable commercial embodiment of film units which may be used in carrying out the inventon are those manufactured and sold by Polaroid Corporation of Cambridge, Mass. and designated as Type TLX Radiographic Packets. Apparatus such as cassettes and processors designed to hold such film units during radiographic exposure and to assist in the development or processing thereof are the subject of further U.S. patents and pending applications and will be referenced in the following detailed description insofar as they relate to the present invention.

It is a principal object of the present invention to provide apparatus for exposing a predetermined portion of a photosensitive film unit, other portions of which have been previously exposed and processing composition having been spread over both the exposed and previously unexposed portions of the photosensitive material.

It is a further object to provide apparatus of the character described for producing an image, in a previously unexposed portion of a photosensitive film unit, of indicia relating to an image previously formed by exposure of other portions of the same film unit.

It is another object to provide apparatus for exposing a predetermined, unexposed portion of a self-developing film unit in response to movement of the film unit into an exposure position, such movement also being effective to spread a liquid processing composition between a pair of sheets of the film unit.

A still further object is to provide, in combination with processing apparatus having a pair of pressure rolls between which a film unit of the self-developing type is advanced to effect processing thereof, apparatus for exposing, through one of the layers of the film unit, a previously unexposed portion of the photosensitive layer of the film unit in response to movement of the film unit through the pressure rolls.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a somewhat diagrammatic front view of the film unit showing its position with respect to other elements of the apparatus at the time of exposure; and FIG. 5 is an elevational view of one form of processing apparatus with which the present invention may be associated.

Figure 1:
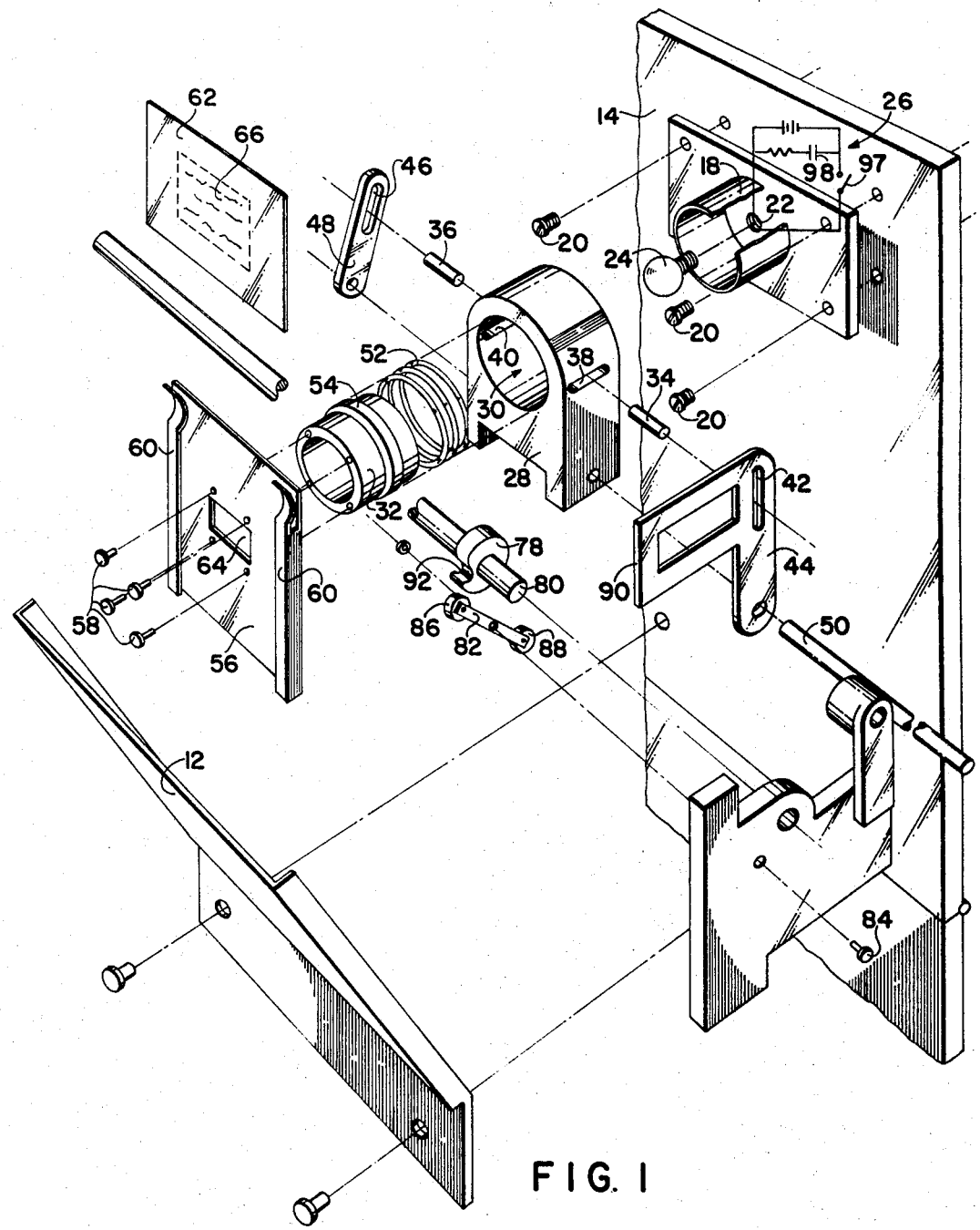
FIGURE 1 is an exploded perspective view of one embodiment of the present invention, with certain portions shown in fragment and other shown schematically.

Referring now to the drawings, FIG. 1 illustrates the principal elements of the apparatus which forms the present invention. These elements will be described first, and their manner of operation and relationship to one form of photographic apparatus in conjunction with which they may be employed will be described later.

The elements are mounted within a chamber adapted to enclose a film unit of the self-developing type during processing thereof. Accordingly, the chamber includes a light-protected entrance area for the film unit and is movable between a closed, lighttight position and an open position to allow removal of the film unit at the end of a predetermined processing period. The chamber is designated generally by the reference numeral 10 in subsequent figures, and portions of two opposing walls thereof are shown in FIG. 1 and designated by the numerals 12 and 14. Mounting plate 16, having open cylindrical unit 18 extending fixedly therefrom, is attached by means of rivets 20 to wall 14 of chamber 10. Receptacle 22 within element 18 is provided for light bulb 24. A suitable electrical circuit, indicated generally by the reference numeral 26, is provided for supplying electrical power of an appropriate magnitude to light bulb 24 in response to actuation as described hereinafter.

Mounting block 28 is fixedly supported upon cylinder 18, which extends into opening 30 in mounting block 28. Sleeve 32 is slidably movable within opening 30 and is supported by pins 34 and 36 which extend through elongated slots 38 and 40, respectively, in opposite sides of mounting block 28. Pin 34, at the end opposite its connection with sleeve 32, passes through slot 42 in follower arm 44 and is secured by appropriate washers, snap rings or the like (not shown). Pin 36, at the end opposite its connection with sleeve 32, passes through slot 46 in link 48, and is likewise secured. Both follower arm 44 and link 48 are pivotally mounted, at the ends opposite those through which pins 34 and 36 pass, upon rod 50 which passes through appropriate openings in mounting block 28. Coil springs 52 is positioned between the rim of cylinder 18 and flange 54 of sleeve 32, thereby exerting a biasing force tending to move the sleeve away from cylinder 18, and thus away from wall 14 and toward wall 12. Card holder 56 is attached by means of rivets 58 to sleeve 32 for movement therewith, and includes appropriate flanges 60, or other such means for retaining an indicia-bearing card 62. Opening 64 in card holder 56 is positioned for registration with an indicia-bearing portion 66 of card 62.

Figure 2:
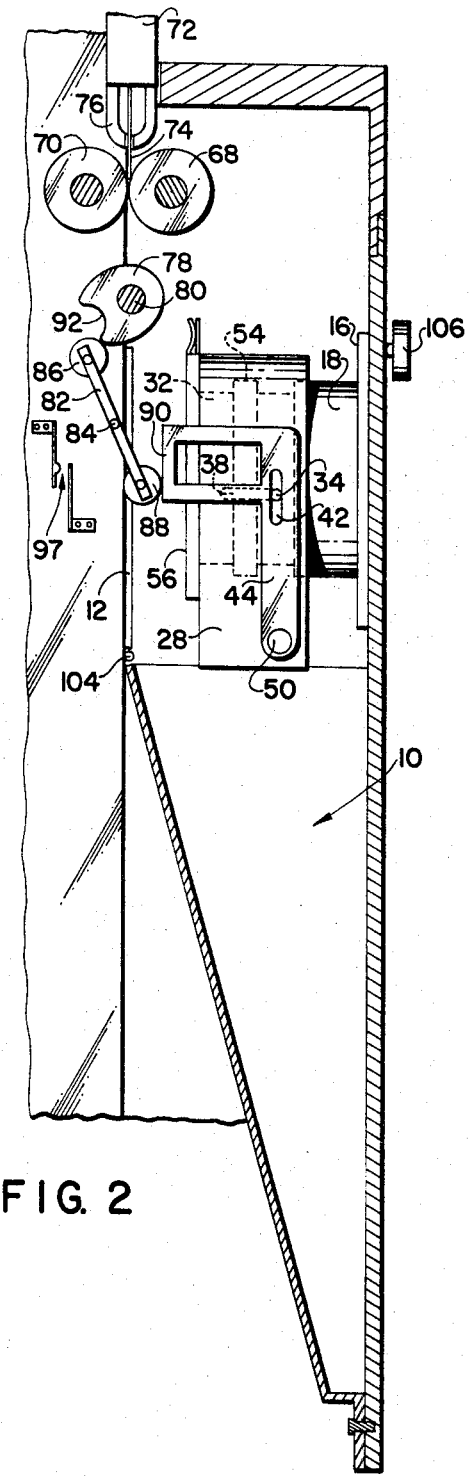
FIG. 2 is a side elevational view of portions of the apparatus shown in a first position of their relative movement.
Figure 3:
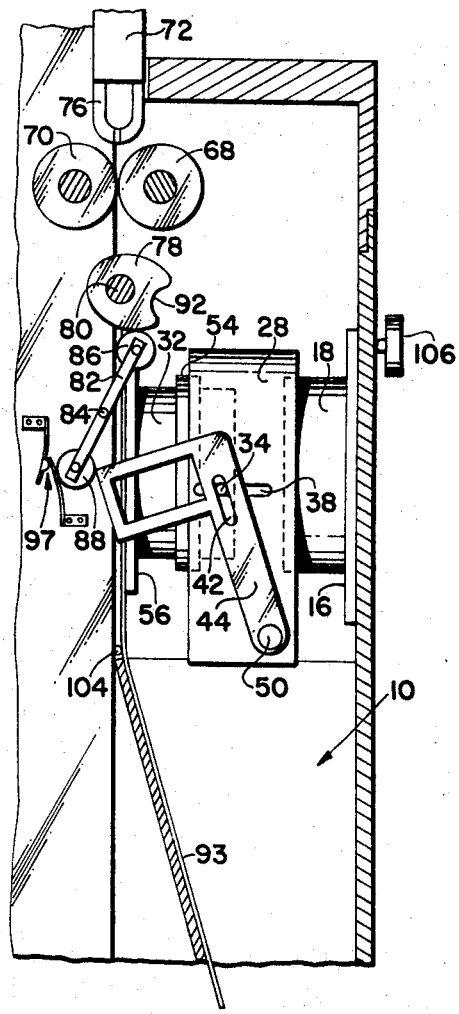
FIG. 3 is a side view, as in FIG. 2 with the elements shown in a second position.

In FIGS. 2 and 3 the elements just described are shown in combination with certain other portions of photographic apparatus for processing a film unit of the self-developing type. Such elements include a pair of pressure-applying members in the form of rotatably mounted rolls 68 and 70. The latter are adapted to applying compressive force to a film unit of the type having a pair of superposed, liquid confining layers and a contained liquid processing composition for the purpose of effecting release of the processing composition and spreading it between the sheets. Such a film unit is shown for illustrative purposes in the present drawings as being initially held within an X-ray cassette indicated diagrammatically by the reference numeral 72. Leader element 74 of the film unit extends outside of the cassette and is directed by guide means 76 toward the bite of pressure rolls 68 and 70 when cassette 72 is properly positioned on the processing apparatus. With the cassette in this position the film unit may be withdrawn therefrom by rotation of the pressure rolls without being exposed to actinic light. As the film unit passes between the pressure rolls, it is directed into chamber 10, which is in the closed, lighttight position.

Cam 78 is mounted on rotary cam shaft 80 which is driven by the same means used to drive the pressure rolls, as more fully described later herein. Rocker arm 82 is mounted for pivotal movement on pin 84 and includes, at opposite ends thereof, small rollers 86 and 88 for rolling engagement with cam 78 and edge 90 of follower arm 44, respectively. The rotation of cam 78 is synchronized with rotation of spread rolls 68 and 70 and with respect to the advancement of a film unit therebetween. The elements are shown in FIG. 2 at the beginning of a cycle, that is, when a film unit is positioned for engagement of the leading portion thereof between the pressure rolls. At this time cam 78 bears on roller 86 to cause rocket arm 82 to maintain a position wherein follower arm 44 holds sleeve 32 away from wall 12, against the bias of spring 52. The elements remain in this position as cam 78 and pressure rolls 68 and 70 continue to rotate until the film unit has been advanced to a point near the end of its travel through the rolls. At this time depressed portion 92 of cam 78 comes into contact with roller 86, thus allowing rocker arm 82 to rotate in a clockwise direction to the position seen in FIG. 3. This movement removes roller 88 from contact with edge 90. Since follower arm 44 no longer restrains movement of sleeve 32, spring 52 is free to move the sleeve, and thereby holder 56 and card 62, toward wall 12.

When the elements reach the position of FIG. 3, the film unit, indicated generally by the reference numeral 93, is in a predetermined position within chamber 10 hereinafter referred to as the "exposure position." This position is also shown in FIG. 4 as seen from the front of the film unit. The sheet of film unit 93 shown in FIG. 4 may be either the support for the photosensitive layer or the second, preferably print receiving, sheet. In either case sheet 94, i.e., the sheet facing card 62, is made of a material which will transmit visible light to an extent sufficient to photoexpose the photosensitive layer of the film unit which is positioned between the sheets. Appropriate guide means 96 may be provided within chamber 10 to assist in guiding the film unit to the exposure position. When the film unit has reached the exposure position, the elements move as earlier described to engage a predetermined position of the film unit between wall 12 and card 62, the latter being held rigid by card holder 56. When the elements have reached this position, switch 97 is closed by the rotation of arm 82. Switch 97 may also be seen in the schematic electrical circuit 26 of FIG. 1. Bulb 24 will thus receive a momentary pulse of electrical current from the discharge of capacitor 98. Bulb 24 and circuit 26 are preferably of the type disclosed in U.S. Patent No. 3,077,534 which discloses the use of an incandescent filament bulb or repeated photographic exposures.

The light output of bulb 24 in response to discharge of capacitor 98 is calculated, with respect to the relative sensitivity of the photosensitive layer of the film unit and the light transmission characteristics of the portion of sheet 94 through which the light passes, to provide a proper latent image of the indicia carried on portion 66 of card 62 in the adjacent photosensitive portion of the film unit. Since the light also passes through card 62 in making the exposure, the material from which the card is constructed will also have a bearing on the resulting exposure. Many suitable materials having the required range of light transmission are available for this purpose, and the amount of light needed for proper exposure may easily be calculated from a knowledge of the light transmission characteristics of portion 66 of card 62 and the adjacent portion of sheet 94. From a knowledge of the amount of light required for proper exposure, a suitable electrical circuit and light source for providing such light may easily be constructed by those skilled in the art.

In FIG. 5 is shown a general view of photographic processing apparatus of the type more fully described in U.S. Patent application Ser. No. 471,091, filed June 12, 1965 of Philip D. Bartlett et al. Such apparatus is designed primarily for the processing of radiographic film units initially held in a cassette and fed directly from the cassette into the processor. Cassette 72, a fragment of which is shown in FIGS. 2 and 3, is seen in FIG. 5 positioned upon processing apparatus 100 for removal of the film unit from the cassette and processing thereof by apparatus 100.

While the specific design of cassette 72 and the film unit initially contained therein are not material to the present invention, except for the general requirements of the film units previously described herein, suitable examples of the two may be found, respectively, in U.S. patent applications Ser. Nos. 471,090 and 171,364. Chamber 10, described in connection with the preceding figures, is shown in FIG. 5 in relation to the other elements of apparatus 100. Also associated with the processing apparatus are suitable drive means enclosed within housing 102. The drive means are not shown in detail since the may be of any suitable, conventional design such as a mechanical spring motor, an electrically powered motor, or the like. The drive means are arranged to supply motive power, upon proper actuation which may be provided by the positioning of cassette 72 upon the apparatus as described in previously mentioned U.S. patent application Ser. No. 471,091, to pressure rolls 68 and 70 and to cam shaft 80. Suitable gearing means may be provided if required to properly synchronize rotation of the pressure rolls and cam 78. The synchronization is provided with respect to the advancement of a film unit between the pressure rolls so that the previously described operations occur in proper sequence. That is, as the film unit is being moved out of the cassette and between the pressure rolls, by rotation thereof, cam 78 maintains the movable elements carrying card 62 in a position away from wall 12 to permit movement of the film unit into the exposure position. Further movement of the cam when the film unit arrives at the exposure position allows movement of the elements under the bias of spring 52 to engage the film unit between card 62 and wall 12. Immediately upon such engagement, movement of arm 82 closes switch 97, thereby actuating the light source which records the indicia carried by card 62 in the photosensitive layer of the film unit. This image will develop spontaneously since the processing agent has already been spread between the photosensitive and the second layer of the film unit. Continued movement of cam 78 will move rocker arm 82, and thereby the other movable elements of the mechanism, back to their positions of FIG. 2, thereby removing card 62 from engagement with film unit 93 and positioning the elements to begin a new cycle.

As previously mentioned, chamber 10 is designed to be moved to an open position to allow withdrawal of the film unit therefrom after a predetermined processing period. Lower portions of walls 12 and 14 are mounted for pivotal movement with respect to apparatus 100 by means of hinge 104 (FIGS. 2 and 3). Suitable, manually operated latch means, movable between locked and unlocked positions by engagement of handle 106, are provided on wall 14. Thus, at the end of the processing period the operator may move handle 106 to open the latching means and allow the lower portion of chamber 10 to pivot in a clockwise direction, as seen in FIGS. 2 and 3, about hinge 104. Of course, the movable elements associated with wall 14 may move under the bias of spring 52 since edge 90 of the follower arm 44 is moved out of engagement with roller 88 of rocker arm 82. However, this will not engage the film unit between card 62 and a portion of wall 12 since the unit has been moved away from the portion of the wall previously engaged thereby. The film unit may, therefore, by easily removed from chamber 10 upon movement of the latter to the open positions. When chamber 10 is returned to the closed position, edge 90 will again contact roller 88 and the elements will be retained away from engagement with wall 12 since cam 78 has remained in the same position during removal of the film unit from chamber 10.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. Photographic apparatus for use with a photosensitive film unit of the self-developing type having a pair of liquid-confining layers, one of which includes a predetermined area adapted to transmit visible light, said apparatus comprising, in combination:

(a) means defining a lighttight chamber having an entry portion for movement of said film unit into said chamber;
(b) spreading means positioned adjacent said entry portion and adapted to effect the spreading of a liquid processing composition between said layers as said film unit is moved into said chamber;
(c) a light source positioned within said chamber and adapted, upon actuation, to emit visible light;
(d) positioning means for holding said film unit in an exposure position within said chamber wherein said predetermined area of said one layer is in the path of light from said source;
(e) means for positioning indicia-carrying means between said light source and said predetermined area, whereby an image of the indicia is formed in the photosensitive layer of said film unit in said predetermined area upon actuation of said light source; and
(f) means for actuating said light source in response to movement of said film unit into said exposure position.

2. The invention according to claim 1 wherein said spreading means comprise a pair of juxtaposed pressure rolls and drive means for effecting rotation thereof.

3. The invention according to claim 2 wherein said means for actuating said light source are operated by said drive means.

4. The invention according to claim 1 and further including means for moving said indicia-carrying means into engagement with said predetermined area of said film unit in response to movement thereof into said exposure position.

5. The invention according to claim 4 and further including biasing means tending to move said indicia-carrying means into engagement with said predetermined portion, and cam means movable to control movement of said indicia-carrying means.

6. The invention according to claim 5 and further including drive means operable to effect movement of said film unit into said chamber and to move said cam means.

7. The invention according to claim 6 wherein said means for actuating said light source are operated by movement of said cam means.

8. The invention according to claim 7 wherein movement of said film unit is so synchronized with movement of said cam means that said light source is actuated upon movement of said indicia-carrying means into engagement with said predetermined portion of said film unit, the latter having been moved to said exposure position prior to movement of said indicia-carrying means.

9. The invention according to claim 8 wherein said cam means is so constructed and arranged that further movement thereof, after operation of said means for actuating said light source, is effective to move said indicia-carrying means out of engagement with said predetermined area of said film unit to allow withdrawal thereof from said chamber.

No References Cited.

JOHN M. HORAN, *Primary Examiner.*